(12) United States Patent
Tsai

(10) Patent No.: US 7,600,765 B2
(45) Date of Patent: Oct. 13, 2009

(54) HAND TRUCK

(76) Inventor: Haiming Tsai, P.O. Box 6-9, Tainan (TW)

( * ) Notice: Subject to any disclaimer, the term of this patent is extended or adjusted under 35 U.S.C. 154(b) by 225 days.

(21) Appl. No.: 11/725,049

(22) Filed: Mar. 19, 2007

(65) Prior Publication Data

US 2008/0197591 A1    Aug. 21, 2008

(30) Foreign Application Priority Data

Feb. 16, 2007    (TW) .............................. 96106043 A

(51) Int. Cl.
B62B 1/04 (2006.01)
(52) U.S. Cl. .................... 280/47.18; 280/652; 280/47.2
(58) Field of Classification Search ............. 280/47.18, 280/47.2, 651, 652, 645, 654
See application file for complete search history.

(56) References Cited

U.S. PATENT DOCUMENTS

| | | | | |
|---|---|---|---|---|
| 3,785,669 A * | 1/1974 | Doheny | .................... | 280/47.18 |
| 3,865,392 A * | 2/1975 | Hartway | ...................... | 280/35 |
| 4,561,674 A * | 12/1985 | Alessio | ....................... | 280/655 |
| 4,802,681 A * | 2/1989 | Hung | ....................... | 280/47.18 |
| 4,969,660 A * | 11/1990 | Spak | .......................... | 280/646 |
| 5,476,282 A * | 12/1995 | Dahl | .......................... | 280/651 |
| 5,626,351 A * | 5/1997 | Tsai | ............................ | 280/40 |
| 6,302,414 B1* | 10/2001 | Berthiaume et al. | ...... | 280/47.18 |
| 6,308,967 B1* | 10/2001 | Stallbaumer et al. | ...... | 280/47.18 |
| 6,328,319 B1* | 12/2001 | Stahler, Sr. | .............. | 280/47.18 |
| 6,364,328 B1* | 4/2002 | Stahler, Sr. | .............. | 280/47.18 |
| 6,375,200 B1* | 4/2002 | Harter | ......................... | 280/30 |
| 6,588,775 B2* | 7/2003 | Malone, Jr. | .............. | 280/47.18 |
| 6,758,482 B2* | 7/2004 | Stallbaumer | ............. | 280/47.27 |
| 6,789,809 B2* | 9/2004 | Lin | ......................... | 280/47.25 |
| 6,938,905 B1* | 9/2005 | Tsai | ......................... | 280/47.29 |
| 6,966,574 B1* | 11/2005 | Dahl | .......................... | 280/651 |
| 7,195,255 B1* | 3/2007 | Tsai | ......................... | 280/47.29 |
| 7,464,947 B2* | 12/2008 | Cortese | ................... | 280/47.27 |
| 2008/0197590 A1* | 8/2008 | Tsai | ......................... | 280/47.18 |

* cited by examiner

Primary Examiner—Jeffrey J Restifo

(57) ABSTRACT

A hand truck includes a frame, a telescopic handle pivotally connected with the frame, and a joint structure assembled between the frame and the handle. The frame is disposed with a collapsible wheel unit adjustable in position, and the handle and the frame can be bent and extended to a proper length and then fixed in position so that a user can push the hand truck with convenience. Further, the hand truck can be shaped alternately into a two-wheel vertical truck or a four-wheel platform hand truck.

1 Claim, 7 Drawing Sheets

HAND TRUCK

BACKGROUND OF THE INVENTION

1. Field of the Invention

This invention relates to a hand truck, particularly to one having multi-function and able to be converted into a two-wheel hand truck or a four-wheel hand truck, able to be collapsed and convenient in use.

2. Description of the Prior Art

Hand trucks frequently used at present include two-wheel hand trucks and four-wheel hand trucks to be optionally chosen for use, but these two kinds of conventional hand trucks can be used for carrying and transporting goods only under a single form. Substantially, different kinds of goods have to be carried and transported by different kinds of hand trucks. For instance, some goods can be carried and transported comparatively conveniently and quickly, while others can be carried and transported by a conventional platform hand truck comparatively steadily. However, the conventional vertical or platform hand trucks is used to carry goods only in a single form, but cannot be changed in forms; therefore, if a user has to use the two conventional hand trucks alternately, he has to purchase two different kinds of hand trucks, thus increasing expense and taking too much space. A hand truck disclosed in a U.S. Pat. No. 6,938,905, which is designed by the inventor of this invention, can solve such a problem; nevertheless, this hand truck has something necessary to be improved, inclusive of disassembling and collapsing of its handle and wheels.

SUMMARY OF THE INVENTION

The objective of this invention is to offer a hand truck able to be collapsed and shaped alternately into a two-wheel or a four-wheel hand truck according to a user's needs, convenient in use.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
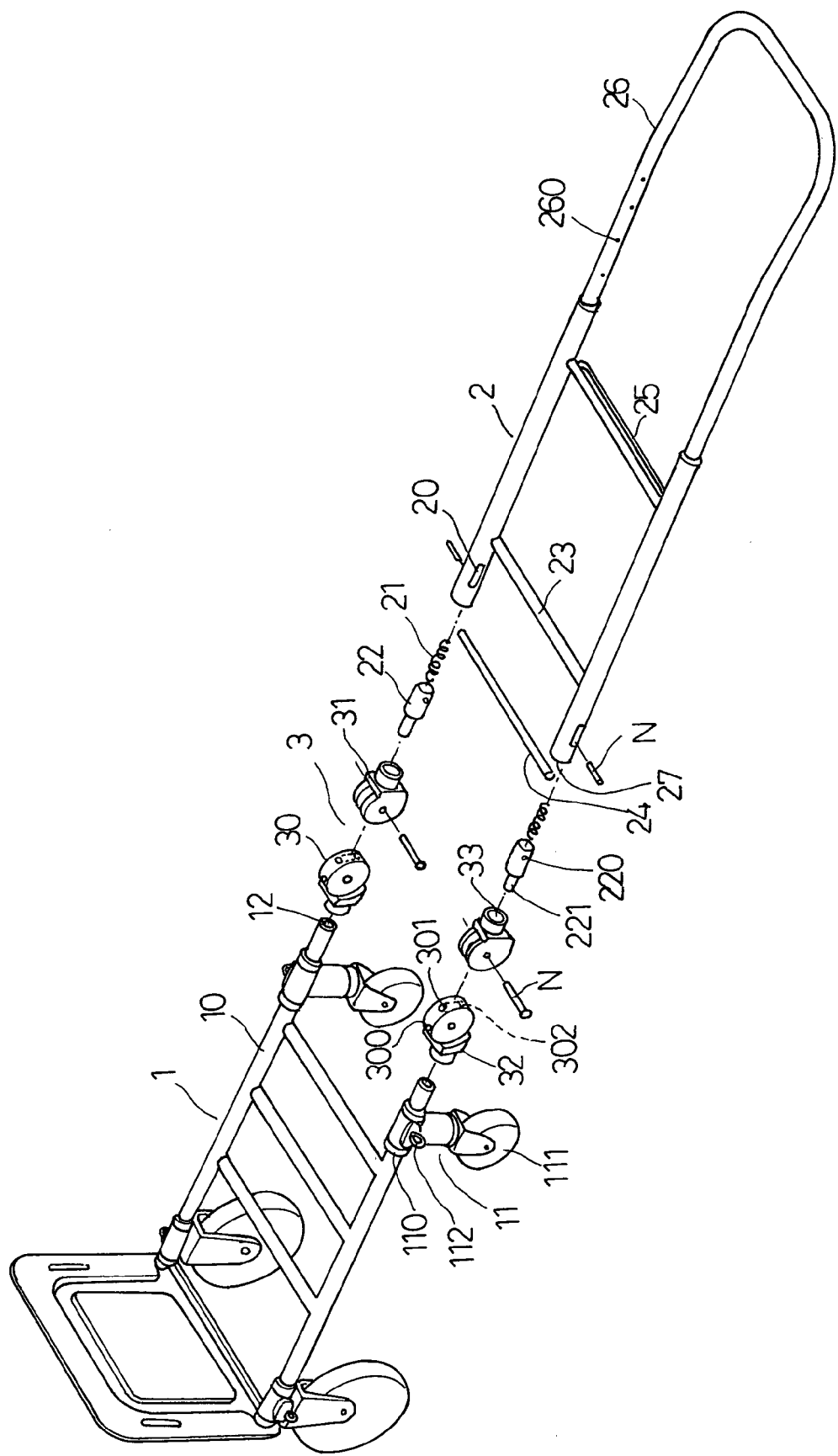
FIG. 1 is an exploded perspective view of a hand truck in the present invention.
Figure 2:
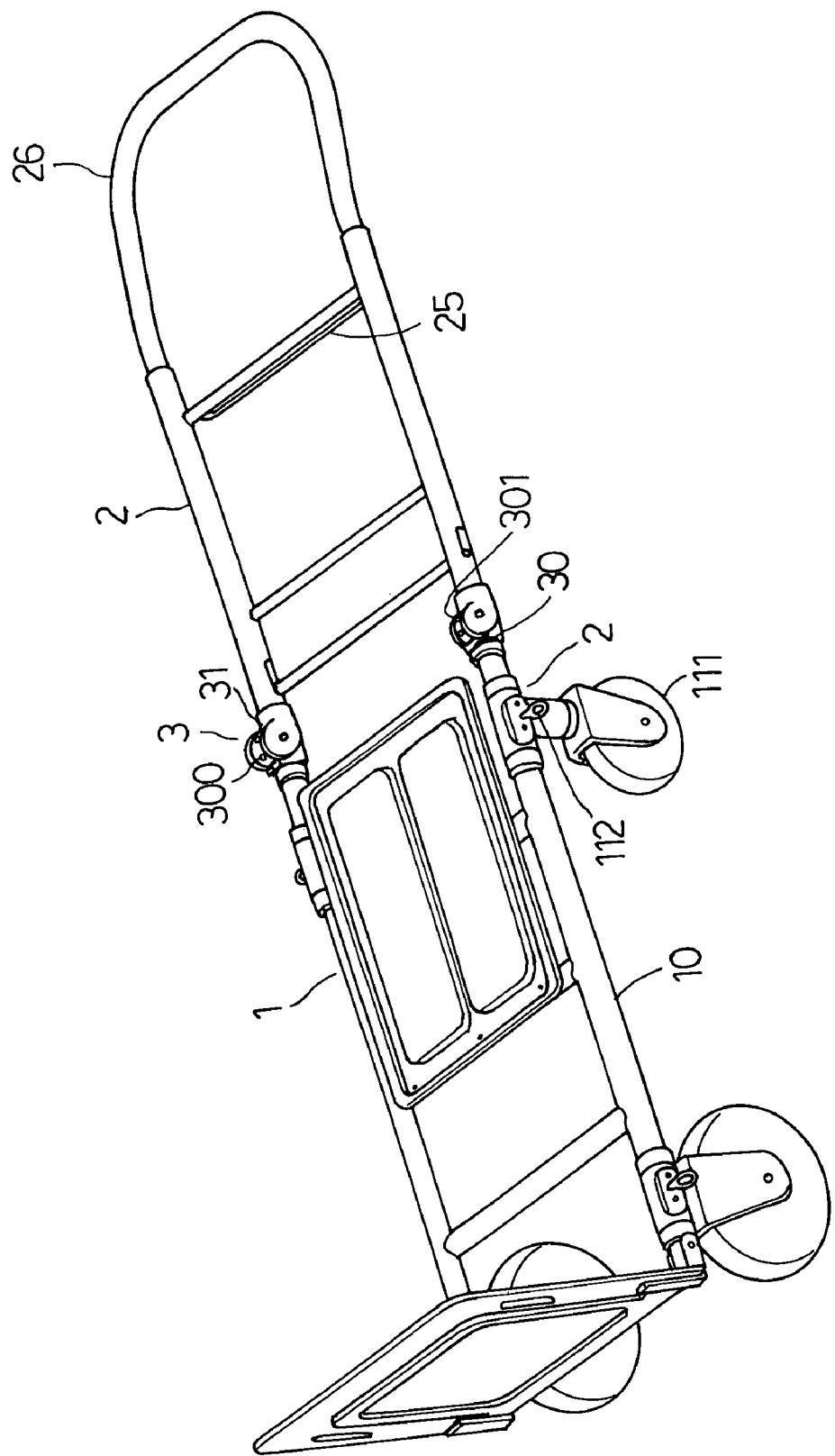
FIG. 2 is a perspective view of the hand truck in the present invention.

A preferred embodiment of a hand truck in the present invention, as shown in FIGS. 1 to 8, includes a frame 1, a handle 2, a joint structure 3 and positioning members (N) as components combined together.

The frame 1 has its opposite frame rods 10 respectively assembled thereon with a wheel unit 11 able to be collapsed and respectively provided with a fitting member 12 and positioning holes 13. Each wheel unit 11 is composed of a wheel-base 110, a wheel 111 and an angle-adjusting device 112, which consists of a pull member 1120, a positioning member 1121, a positioning plate 1122, an elastic member 1123 and a cover 1124. The positioning member 1121, the positioning plate 1122 and the pull member 1120 are pressed by the elastic member 1123, letting the positioning member 1121 inserted in the positioning hole 13 of the frame rod 10, and the positioning plate 1122 and the positioning member 1121 are controlled by the pull member 1120. When the pull member 1120 is pulled upward, the positioning plate 1122 and the positioning member 1121 will be actuated to move up, and the positioning member 1121 will be moved away from the positioning hole 13 of the frame rod 10. At this time, the wheel unit 11 can be collapsed or stretched out easily.

The handle 2 assembled with the frame rods 10 of the frame 1 has its lower sides provided with two positioning slide slots 20 opposite to each other, two elastic members 21, two slide-engage members 22, a lateral positioning rod 23 and a lateral pull rod 24. The two elastic members 21 are respectively fitted in the tube holes of the handle 2, having one end resisting against the lateral positioning rod 23. The two slide engage members 22 are respectively inserted in the inner diameters of the handle 2, letting the outer end of the elastic member 21 push against one end of the slide-engage member 22. Afterward, the slide-engage members 22 are pressed to have their insert holes 220 respectively aligned to the two positioning slide slots 20, and then the lateral pull rod 24 has its opposite ends respectively inserted in both the position-slide slot 20 and the insert hole 220 and firmly positioned therein by a positioning member (N), letting the slide-engage members 22 controlled by the lateral pull rod 24 to slide in the inner diameters of the handle 2. Further, the two slide-engage members 22 have their lower ends respectively secured with a positioning stud 221, and the handle 2 has its upper end provided with a control member 25 and fitted therein with a telescopic U-shaped grip 26 bored with a plurality of positioning holes 260, with the control member 25 adjusting the telescopic grip 26 in height and fixing it in position. The handle 2 further has its opposite lower ends respectively formed with a fitting portion 27.

The joint structure 3 fitted between the frame rods 10 and the handle 2 is provided with two pivotal blocks 30 and two pivotal bases 31. After pivotally combined together, the pivotal block 30 and the pivotal base 31 can be bent if necessary. The two pivotal blocks 30 respectively have one end fixed with a fitting member 32 to be fitted with the fitting member 12 of the two frame rods 10, and the two pivotal bases 31 respectively have one end fixed with a fitting member 33 to be fitted with the fitting portion 27 of the handle 2. Further, each pivotal block 30 has its circumferential surface bored with positioning holes 300, 301 and 302 at different angles for the positioning stud 221 of the slide-engage member 22 of the handle 2 to be inserted and positioned therein, thus enabling the handle 2 to be firmly positioned at different angles. The two wheel units 11 are respectively secured on the opposite frame rods 10 by means of positioning members (N).

Figure 3:
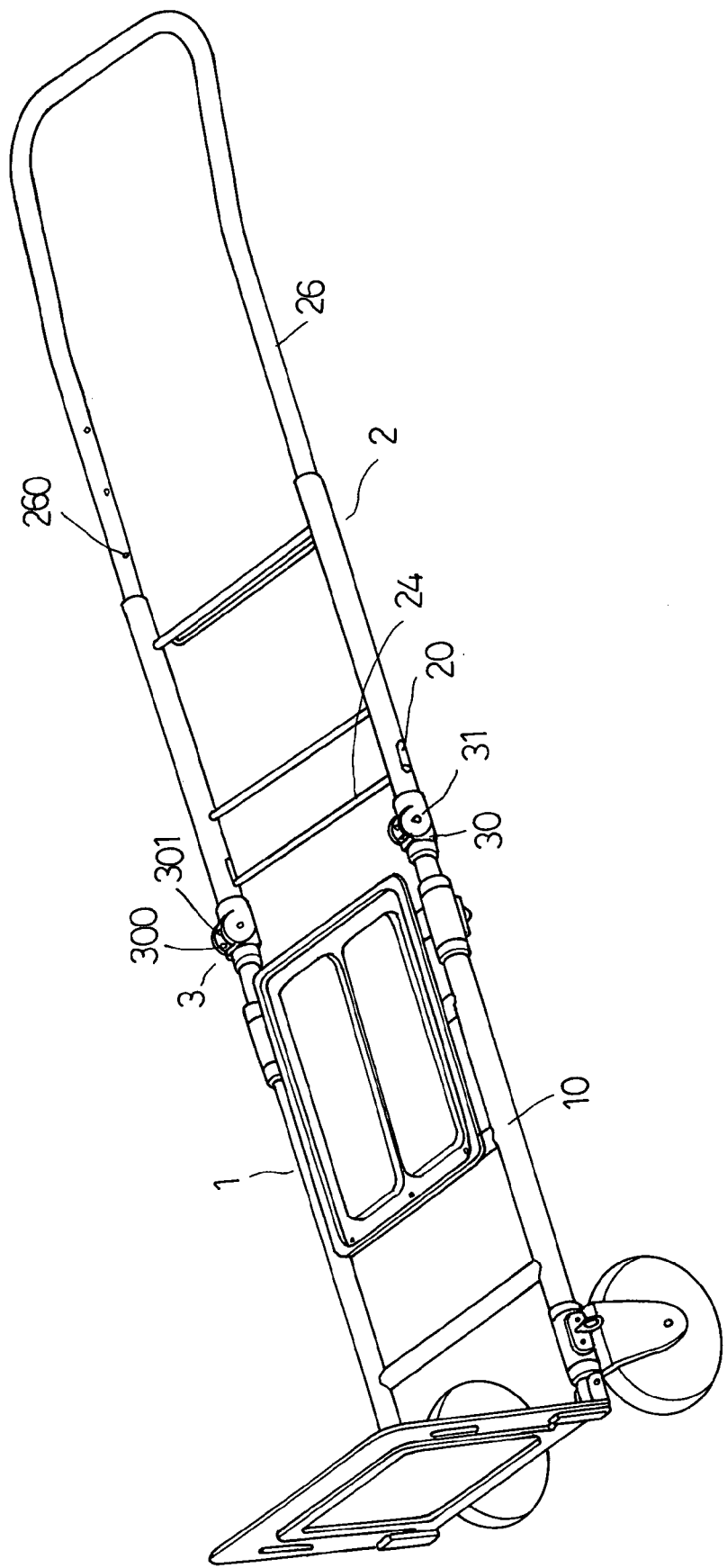
FIG. 3 is a perspective view of the hand truck in a using condition in the present invention.

In using, to shape the hand truck into a two-wheel hand truck, firstly, pull out a cargo fender from the frame 1 and position it at an angle of 90 degrees and then pull the pull members 1120 of the angle-adjusting devices 112 of the wheel unit 11 under the frame 1 to let the positioning members 1121 moved away from the positioning holes 13 of the frame rods 10. Next, collapse inward the wheels 111 and release the pull member 1120 and at this time, the positioning member 1121 will be pressed by the elastic member 1123 to be inserted into the positioning hole 13 at another angle, thus finishing assembly of a two wheel hand truck, as shown in FIG. 3.

Figure 4:
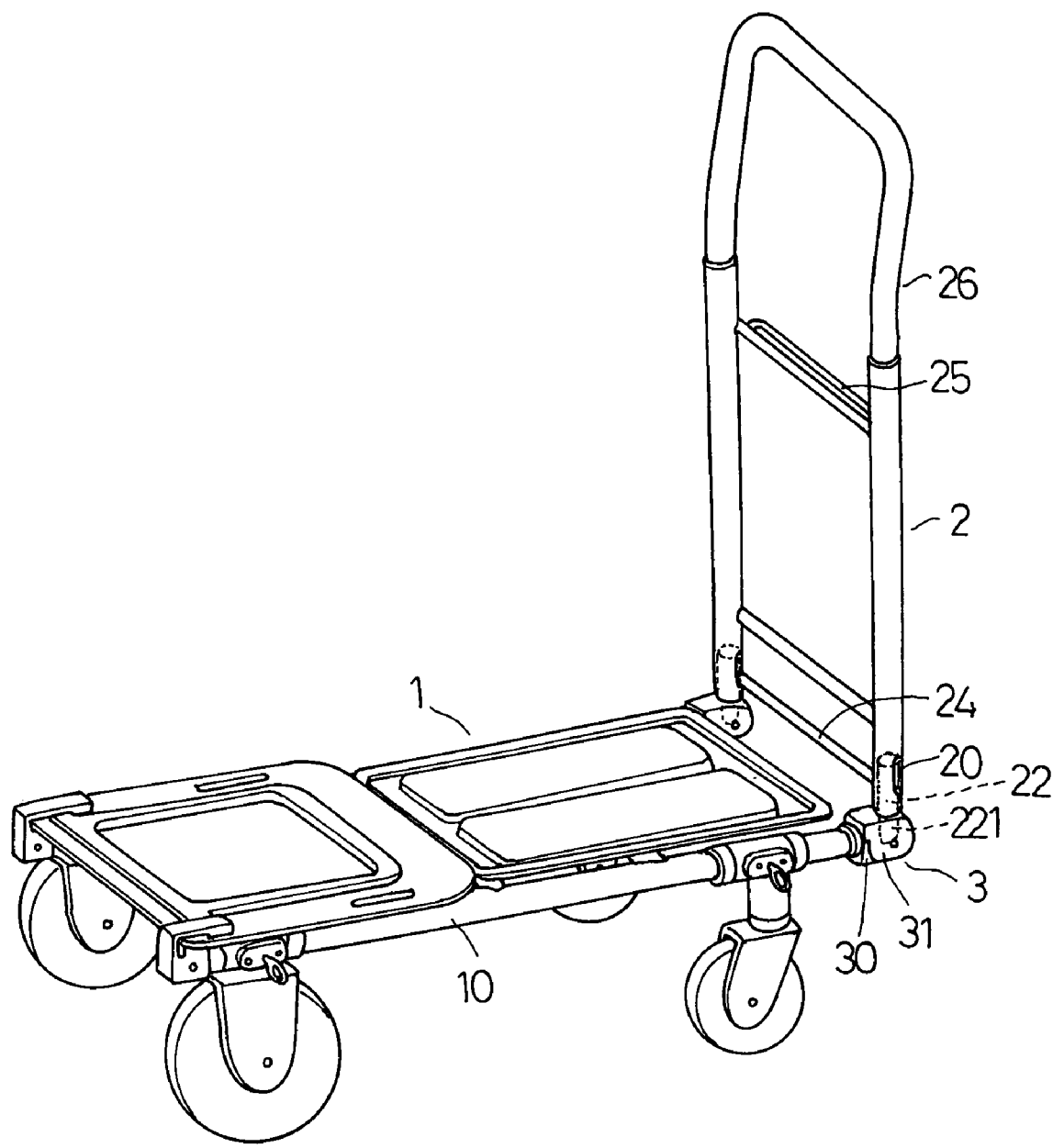
FIG. 4 is a perspective view of the hand truck in another using condition in the present invention.
Figure 6:
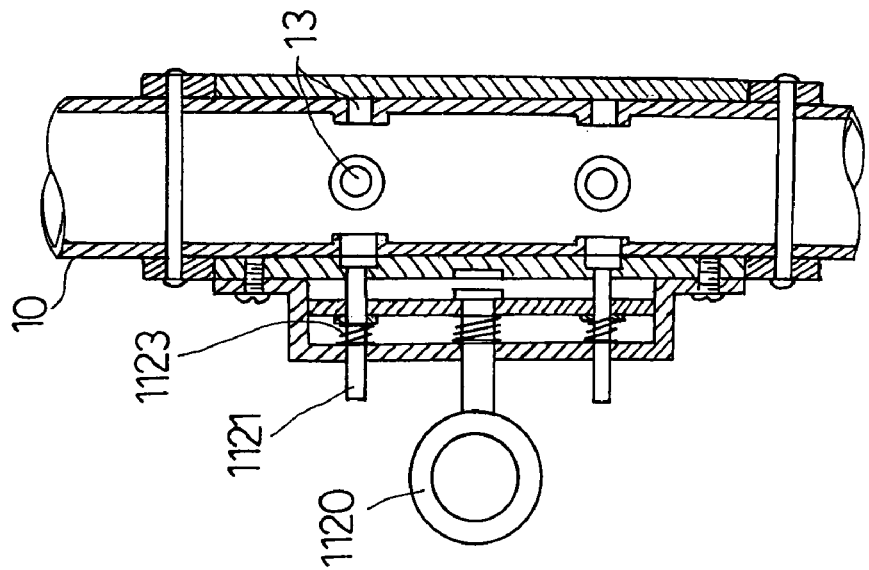
FIG. 6 is another cross-sectional view of the wheel unit fixed in position in the present invention.
Figure 5:
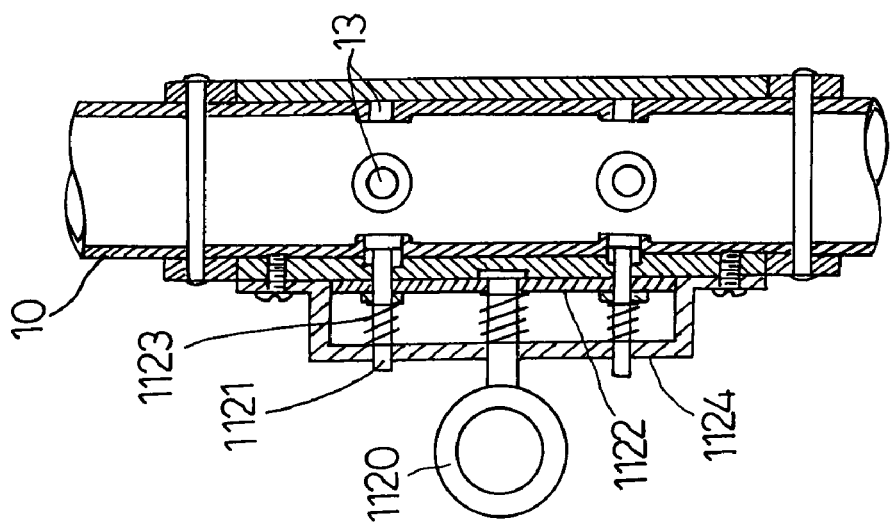
FIG. 5 is a cross-sectional view of a wheel unit fixed in position in the present invention.
Figure 7:
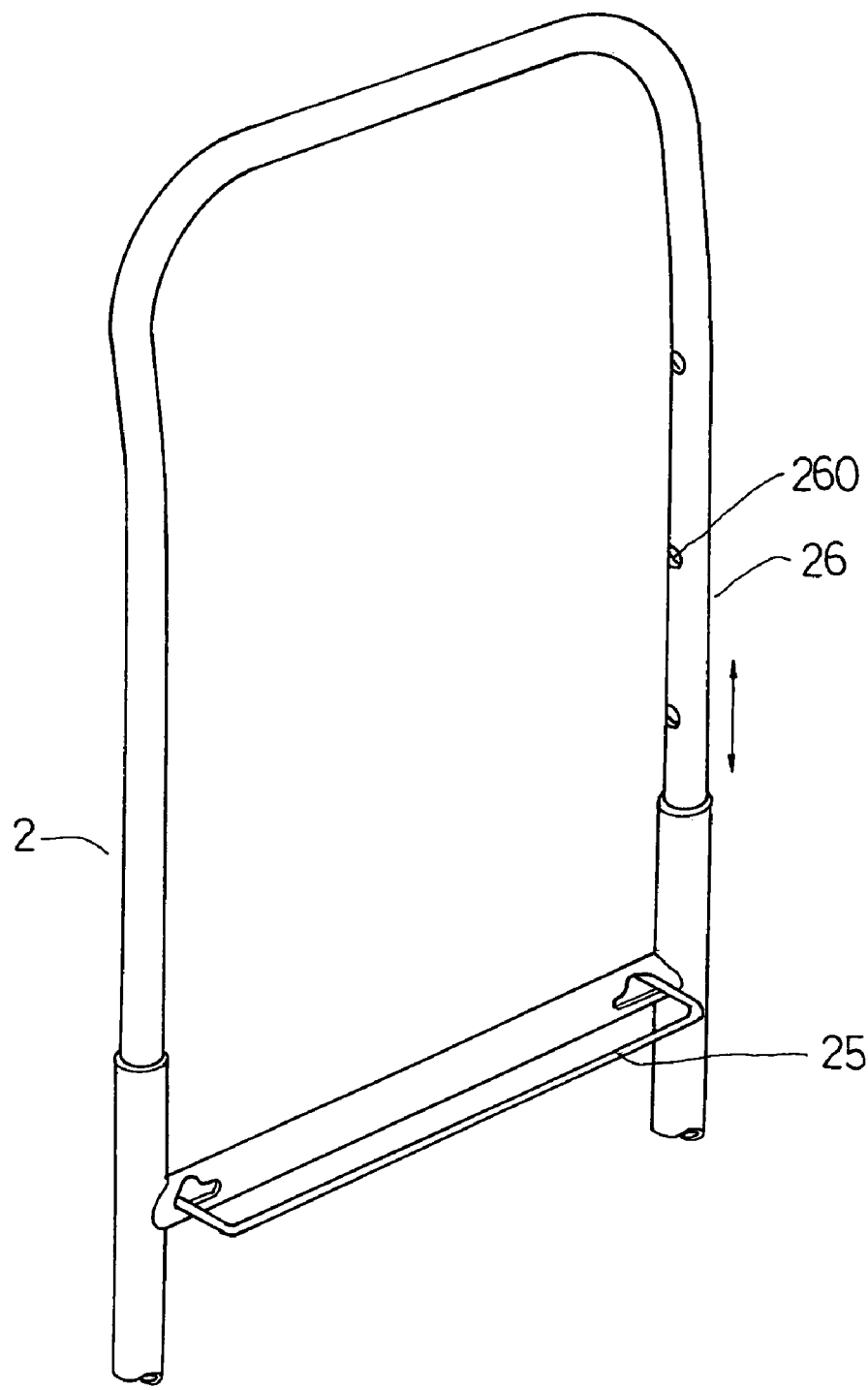
FIG. 7 is a perspective view of a handle in a stretched condition in the present invention.

To shape the hand truck into a four-wheel hand truck, simply pull the pull members 1120 of the angle-adjusting devices 112 to let the positioning members 1121 moved away from the positioning holes 13 of the frame rods 10, and after stretching out the wheels 111 and fixing them in position, release the pull member 1120. At this time, the positioning members 1121 will be pressed by the elastic member 1123 to be inserted into the positioning hole 13 at another angle. Next, pull upward the pull rod 24 of the handle 2 to actuate the positioning studs 221 of the slide-engage members 22 to move away from the positioning holes 302 of the pivotal blocks 30 and, after bending the handle 2 upward for 90 degrees and positioning it perpendicular to the frame 1, release the pull rod 24. At this time, the slide-engage members 22 will be pressed downward by the elastic members 21 to have their positioning studs 221 respectively fitted in the positioning holes 301 of the pivotal blocks 30 to finish assembly of a four wheel hand truck, as shown in FIG. 4.

Figure 8:
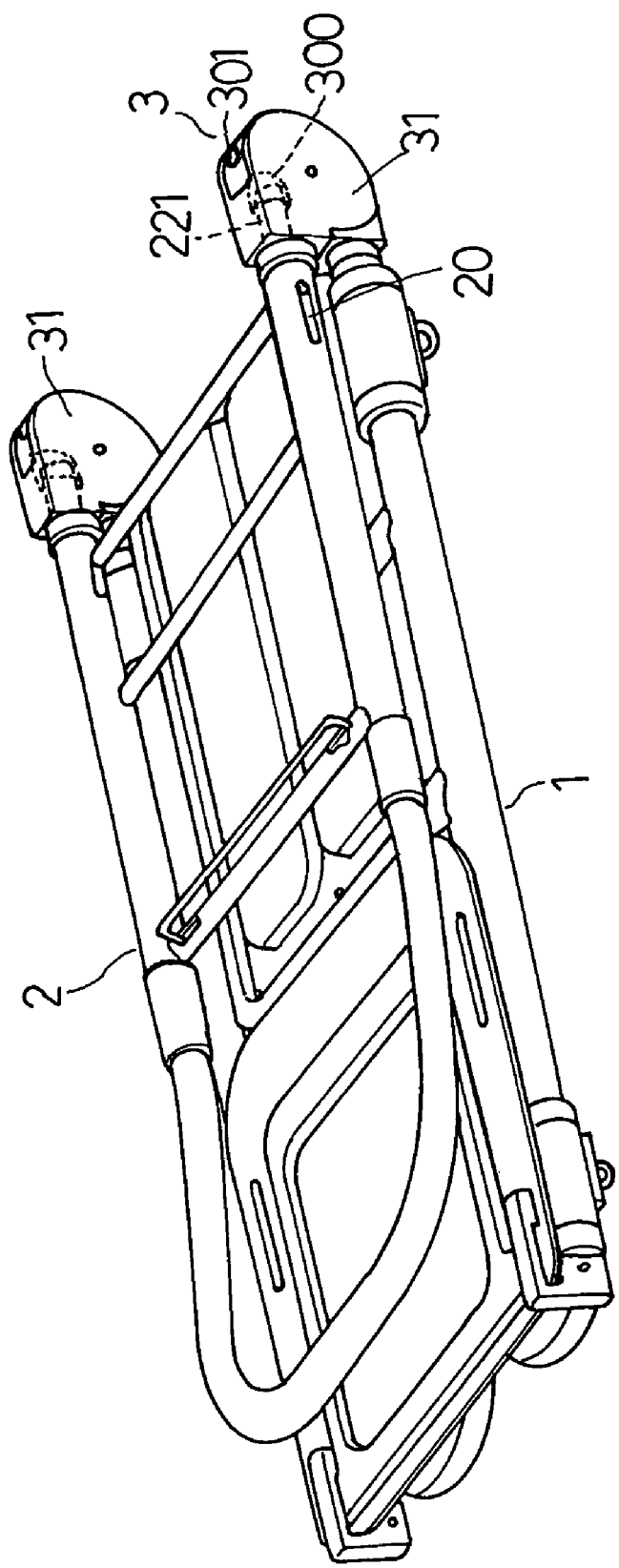
FIG. 8 is a perspective view of the hand truck in a collapsed condition in the present invention.

To collapse the hand truck, firstly, the wheel units 11 are collapsed inward to be positioned under the frame 1 by means of the angle-adjusting devices 112 and then the pull rod 24 of the handle 2 is pulled upward to force the positioning studs 221 of the slide-engage members 22 to move away from the positioning holes 301 of the pivotal block 30. Next, the handle 2 is collapsed inward to be laid on the frame 1 and at this time, the slide-engage members 22 will be pressed down by the elastic members 21 to have their front positioning studs 221 respectively engaged in the positioning holes 300 of the pivotal blocks 30, as shown in FIG. 8. Thus, the hand truck is collapsed not to take much space, and the frame 1 and the handle 2 can be stably positioned on the frame 1 by means of the joint structure 3, convenient in operation.

As can be understood from the above description, this invention has the following advantages.

1. After the hand truck is collapsed, the handle 2 can be stably positioned on the frame 1 by mutual engagement of the positioning studs 221 of the slide-engage members 22 and the positioning holes 300 of the joint structure 3.

2. The frame 1 and the handle 2 controlled by the joint structure 3 can be stably and conveniently adjusted in position as well as in angle.

3. The hand truck of this invention can be shaped alternately into a two-wheel vertical hand truck or a four-wheel platform hand truck for use according to a user's practical needs.

4. Both the wheels 111 and the handle 2 of the hand truck of this invention can be collapsed, facilitating transport and saving space.

5. The telescopic U-shaped grip 26 of the handle 2 can be adjusted in height according to a user's needs, conforming to ergonomics.

While the preferred embodiment of the invention has been described above, it will be recognized and understood that various modifications may be made therein and the appended claims are intended to cover all such modifications that may fall within the spirit and scope of the invention.

I claim:

1. A hand truck comprising:

a frame having two opposite frame rods respectively assembled with a collapsible wheel unit, said two frame rods respectively having the outer end formed with a fitting portion;

a handle pivotally connected with said frame rods of said frame, said handle having opposing lower ends respectively provided with a positioning slide slot, an elastic member, a slide-engage member, a lateral positioning rod and a lateral pull rod, said two elastic members respectively fitted in opposing tube holes formed in said handle, said tube holes respectively defining an inner diameter in said handle, each elastic member having a first end resisting against said lateral positioning rod, said two slide-engage members respectively fitted in the inner diameters of said handle, each elastic member having a second end pushing against a first end of said slide-engage member, said two slide-engage members having insert holes formed therein respectively aligned with opposing ends of said lateral pull rod, said lateral pull rod firmly engaged in said insert holes of said slide-engage members by means of positioning members; and a joint structure unit fitted between said frame rods and said handle, said joint structure unit provided with two pivotal blocks and two pivotal bases, each pivotal block and each said pivotal base respectively having a first end fixed with a fitting member, said pivotal base and said pivotal block being able to be bent after they are combined together, said fitting member of said pivotal block and said pivotal base respectively fitted with said fitting portion of said frame rods and said handle, each said pivotal block having its circumferential surface bored such that a plurality of positioning holes are formed therein and spaced apart at different angles, wherein said hand truck is able to be adjusted and changed in form in accordance with a user's needs.

\* \* \* \* \*